(12) United States Patent
Cutler (10) Patent No.: US 8,165,416 B2
(45) Date of Patent: Apr. 24, 2012

(54) AUTOMATIC GAIN AND EXPOSURE CONTROL USING REGION OF INTEREST DETECTION

(75) Inventor: Ross G. Cutler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 11/771,802

(22) Filed: Jun. 29, 2007

(65) Prior Publication Data

US 2009/0003678 A1 Jan. 1, 2009

(51) Int. Cl.
*G06K 9/40* (2006.01)
*G06K 9/38* (2006.01)
*H04N 5/225* (2006.01)
*H04N 5/235* (2006.01)

(52) U.S. Cl. ............. 382/274; 382/272; 348/207.11; 348/229.1; 348/221.1

(58) Field of Classification Search ................. 382/132, 382/274
See application file for complete search history.

(56) References Cited

U.S. PATENT DOCUMENTS

| | | | |
|---|---|---|---|
| 3,118,340 A | 1/1964 | Iwerks | |
| 4,752,961 A | 6/1988 | Kahn | |
| 4,929,824 A * | 5/1990 | Miyazaki | 382/274 |
| 5,021,818 A | 6/1991 | Satoh et al. | |
| 5,121,426 A | 6/1992 | Baumhauer et al. | |
| 5,264,940 A * | 11/1993 | Komiya et al. | 348/298 |
| 5,281,995 A * | 1/1994 | Terashita et al. | 355/68 |
| 5,343,246 A | 8/1994 | Arai et al. | |
| 5,353,058 A | 10/1994 | Takei | |
| 5,686,957 A | 11/1997 | Baker et al. | |
| 5,787,183 A | 7/1998 | Chu et al. | |
| 5,844,599 A | 12/1998 | Hildin | |
| 6,040,860 A * | 3/2000 | Tamura et al. | 348/252 |
| 6,072,522 A | 6/2000 | Ippolito et al. | 348/14.1 |
| 6,192,196 B1 | 2/2001 | Keller | |
| 6,192,342 B1 | 2/2001 | Akst | |
| 6,211,912 B1 | 4/2001 | Shahraray | |
| 6,275,258 B1 | 8/2001 | Chim | |
| 6,480,300 B1 * | 11/2002 | Aoyama | 358/1.9 |

(Continued)

FOREIGN PATENT DOCUMENTS

JP 59-072295 4/1984

(Continued)

OTHER PUBLICATIONS

Yoshimi, et al., A Multimodal Speaker Detection and Tracking System for Teleconferencing,Dec. 1-6, 2002, Juan-les-Pins, France, pp. 427-428.

(Continued)

*Primary Examiner* — Michelle Entezari
(74) *Attorney, Agent, or Firm* — Merchant & Gould (57) ABSTRACT

A region of interest may be determined using any or all of sound source location, multi-person detection, and active speaker detection. An weighted mean may be determined using the region of interest and a set of backlight weight regions, or, only the set of backlight weight regions if a region of interest could not be found. The image mean is compared to a target value to determine if the image mean is greater than or less than the target value within a predetermined threshold. If the image mean is greater than the predetermined target value and predetermined threshold value, the gain and exposure are decreased. If the image mean is lesser than the predetermined target value minus the predetermined threshold value, the gain and exposure are decreased.

20 Claims, 6 Drawing Sheets

U.S. PATENT DOCUMENTS

| | | | |
|---|---|---|---|
| 6,545,699 B2 | 4/2003 | Satoda | |
| 6,757,442 B1* | 6/2004 | Avinash | 382/274 |
| 6,766,035 B1 | 7/2004 | Gutta | |
| 6,771,819 B2* | 8/2004 | DeYong et al. | 382/228 |
| 6,795,106 B1* | 9/2004 | Cooper | 348/14.08 |
| 6,844,990 B2 | 1/2005 | Artonne et al. | |
| 6,882,971 B2 | 4/2005 | Craner | |
| 6,934,370 B1 | 8/2005 | Leban et al. | |
| 6,950,141 B2* | 9/2005 | Mori et al. | 348/362 |
| 7,020,337 B2 | 3/2006 | Viola et al. | |
| 7,031,499 B2 | 4/2006 | Viola et al. | |
| 7,092,002 B2 | 8/2006 | Ferren et al. | |
| 7,099,510 B2 | 8/2006 | Jones et al. | |
| 7,102,669 B2 | 9/2006 | Skow | |
| 7,117,157 B1 | 10/2006 | Taylor et al. | |
| 7,197,186 B2 | 3/2007 | Jones et al. | |
| 7,206,809 B2 | 4/2007 | Ludwig et al. | |
| 7,212,651 B2 | 5/2007 | Viola et al. | |
| 7,305,078 B2 | 12/2007 | Kardon | |
| 7,362,368 B2* | 4/2008 | Steinberg et al. | 348/349 |
| 7,403,231 B2* | 7/2008 | Kawanishi | 348/364 |
| 7,430,333 B2* | 9/2008 | Yu et al. | 382/254 |
| 7,508,413 B2 | 3/2009 | Nose | |
| 7,538,802 B2* | 5/2009 | Lee | 348/229.1 |
| 7,542,600 B2* | 6/2009 | Yu et al. | 382/167 |
| 7,742,055 B2* | 6/2010 | Phelps | 345/581 |
| 7,778,483 B2* | 8/2010 | Messina et al. | 382/274 |
| 7,782,366 B2* | 8/2010 | Imai | 348/222.1 |
| 7,796,831 B2* | 9/2010 | Tanaka | 382/274 |
| 7,876,367 B2* | 1/2011 | Muramatsu | 348/229.1 |
| 7,948,524 B2* | 5/2011 | Endo et al. | 348/222.1 |
| 2001/0028719 A1 | 10/2001 | Hayashi | 381/92 |
| 2002/0033791 A1 | 3/2002 | Arakawa | |
| 2003/0018475 A1* | 1/2003 | Basu et al. | 704/270 |
| 2003/0043260 A1 | 3/2003 | Yap et al. | |
| 2003/0185424 A1 | 10/2003 | Sato et al. | |
| 2003/0234772 A1 | 12/2003 | Zhang et al. | |
| 2004/0001137 A1 | 1/2004 | Cutler et al. | |
| 2004/0008423 A1 | 1/2004 | Driscoll, Jr. et al. | |
| 2004/0021764 A1 | 2/2004 | Driscoll, Jr. et al. | |
| 2004/0172255 A1 | 9/2004 | Aoki et al. | |
| 2004/0243416 A1 | 12/2004 | Gardos | |
| 2004/0254982 A1 | 12/2004 | Hoffman et al. | |
| 2004/0263636 A1 | 12/2004 | Cutler et al. | |
| 2004/0267521 A1 | 12/2004 | Cutler et al. | |
| 2005/0018828 A1 | 1/2005 | Nierhaus et al. | |
| 2005/0057666 A1 | 3/2005 | Hu et al. | |
| 2005/0178953 A1 | 8/2005 | Worthington et al. | |
| 2005/0276270 A1 | 12/2005 | Buinevicius et al. | |
| 2007/0035632 A1 | 2/2007 | Silvernail et al. | |
| 2007/0160357 A1* | 7/2007 | Lin et al. | 396/65 |
| 2007/0206875 A1* | 9/2007 | Ida et al. | 382/242 |
| 2007/0266092 A1 | 11/2007 | Schweitzer | |
| 2008/0112598 A1 | 5/2008 | Gabara | |
| 2008/0255840 A1 | 10/2008 | Cutler | |
| 2009/0002476 A1 | 1/2009 | Cutler | |
| 2009/0002477 A1 | 1/2009 | Cutler | |
| 2009/0073275 A1* | 3/2009 | Awazu | 348/222.1 |

FOREIGN PATENT DOCUMENTS

| | | |
|---|---|---|
| JP | 1996125835 A | 5/1996 |
| JP | 2001-296343 | 10/2001 |
| JP | 2004-032782 | 10/2004 |
| WO | WO 98/47291 | 10/1998 |
| WO | WO 2006/030995 | 3/2006 |
| WO | WO 2007/003061 | 1/2007 |
| WO | WO 2009/006004 | 1/2009 |

OTHER PUBLICATIONS

Cutler, et al.,"Distributed Meetings: A Meeting Capture and Broadcasting System"Month 1-2, 2000, pp. 1-10.

Asano, et al."Detection and Separation of Speech Event Using Audio and Video Information Fusion and Its Application to Robust Speech Interface" EURASIP Journal on Applied Signal Processing, Feb. 2004, pp. 1727-1738.

Capin et al., "Camera-Based Virtual Environment Interaction on Mobile Devices"; Lecture Notes in Computer Science, Computer and Information Sciences; ISCIS 2006; 9 pgs.

Chang et al., "Automatic Head-Size Equalization in Panorama Images for Video Conferencing"; Microsoft Research, May 2005; 42 pgs.

Cutler et al., "Distributed Meetings: A Meeting Capture and Broadcasting System"; Multimedia '02, Dec. 1-6, 2002; pp. 503-512.

Kapralos et al., "Audio-Visual Localization of Multiple Speakers in a Video Teleconferencing Setting"; 2002; 32 pgs.

Lathoud et al., "AV16.3: An Audio-Visual Corpus for Speaker Localization and Tracking"; S. Bengio and H. Bourland (Eds.): MLMI 2004, LNCS 3361; Springer-Verlag Berlin Heidelberg 2005; pgs. 182-195.

Microsoft Corporation, "Microsoft Eyes Future of Teleconferencing with RoundTable"; Oct. 26, 2006; 2 pgs.

Nanda et al., "Practical Calibrations for a Real-Time Digital Omnidirectional Camera"; Technical Sketches, Computer Vision and Pattern Recognition, Hawaii, US, Dec. 2001; 4 pgs.

*Updated* Microsoft Announces RoundTable (Formerly RingCam) a 360 Degree "Super Webcam"; posted 27 Jun. 2006 by HSL; 5 pgs.

International Search Report mailed Oct. 29, 2008, Appln No. PCT/US2008/067035.

U.S. Official Action dated Oct. 27, 2010 cited in U.S. Appl. No. 11/735,674.

U.S. Official Action dated Apr. 5, 2011 cited in U.S. Appl. No, 11/735,674.

U.S. Official Action dated Nov. 4, 2011 cited in U.S. Appl. No. 11/770,713.

* cited by examiner

AUTOMATIC GAIN AND EXPOSURE CONTROL USING REGION OF INTEREST DETECTION

BACKGROUND

Current video cameras lack sufficient dynamic range to capture different types of scenes. The result of such a lack of dynamic range is that an object of interest in a scene may be underexposed or overexposed, resulting in an image in which the object of interest is either too dark or too bright. In most images, the object of interest may be in the center of the frame and a mask may be used to determine the location of the object of interest. The exposure may then be adjusted based on the current exposure of the area represented by the mask.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for controlling an automatic gain control and/or an automatic exposure control for a camera. A region of interest may be determined using any or all of sound source location, multi-person detection, and active speaker detection. An image mean may be determined using the region of interest and a set of backlight weight regions, or, only the set of backlight weight regions if a region of interest could not be found. The image mean may then be compared to a target value to determine if the image mean falls within the target value within a predetermined threshold. If the image mean is greater than or less than the predetermined target value and predetermined threshold value, the gain may be increased or decreased and the exposure may be increased or decreased.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for controlling an automatic gain control and an automatic exposure control using region of interest detection, the system described is provided as an example and not a limitation. As those skilled in the art will appreciate, the present examples are suitable for application in a variety of different types of systems for controlling an automatic gain control and an automatic exposure control using region of interest detection.

Figure 1:
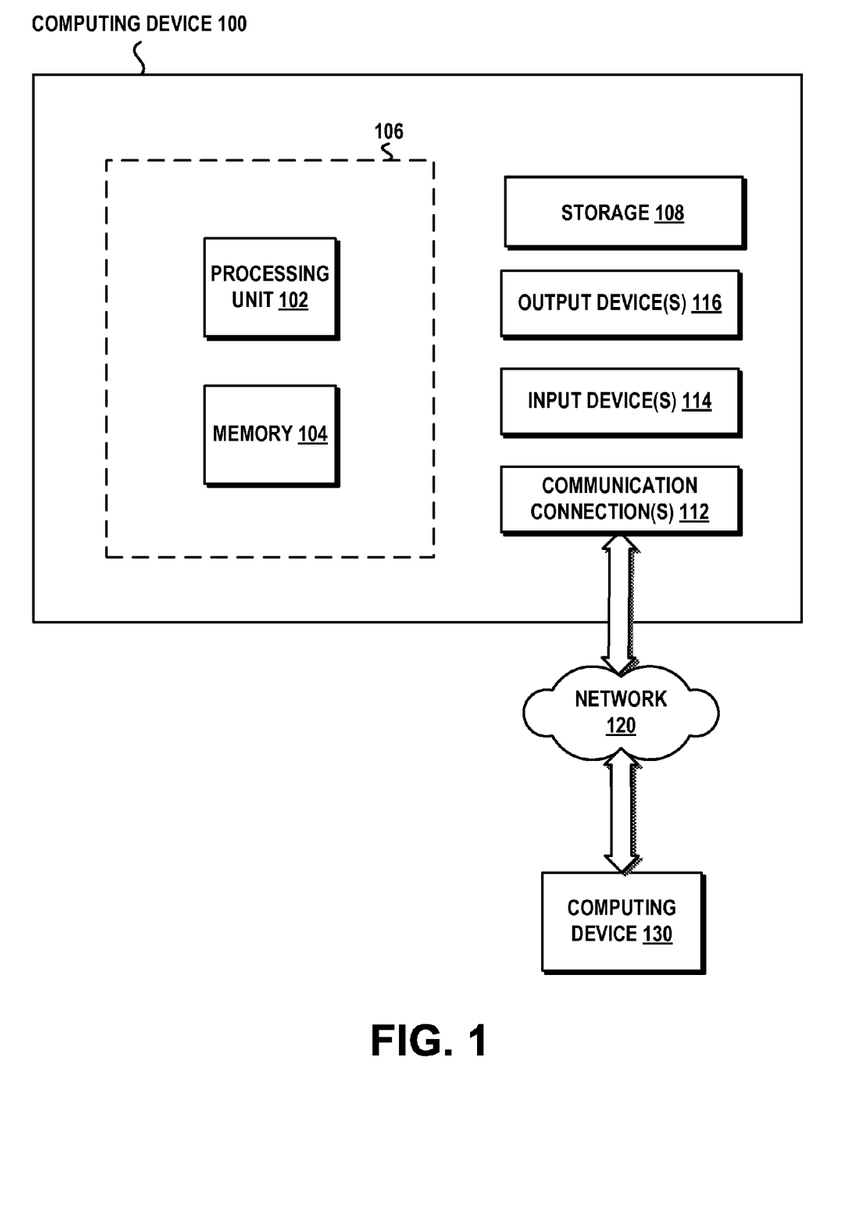
FIG. 1 shows an example of a computing device for implementing one or more embodiments of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 1 shows an example of a computing device 100 for implementing one or more embodiments of the invention. In one configuration, computing device 100 includes at least one processing unit 102 and memory 104. Depending on the exact configuration and type of computing device, memory 104 may be volatile (such as RAM), non-volatile (such as ROM, flash memory, etc.) or some combination of the two. This configuration is illustrated in FIG. 1 by dashed line 106.

In other embodiments, device 100 may include additional features and/or functionality. For example, device 100 may also include additional storage (e.g., removable and/or non-removable) including, but not limited to, magnetic storage, optical storage, and the like. Such additional storage is illustrated in FIG. 1 by storage 108. In one embodiment, computer readable instructions to implement embodiments of the invention may be stored in storage 108. Storage 108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 104 and storage 108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also include communication connection(s) 112 that allow device 100 to communicate with other devices. Communication connection(s) 112 may include, but is not limited to, a modem, a Network Interface Card (NIC), or other interfaces for connecting computing device 100 to other computing devices. Communication connection(s) 112 may include a wired connection or a wireless connection. Communication connection(s) 112 may transmit and/or receive communication media.

Communication media typically embodies computer readable instructions or other data in a "modulated data signal" such as a carrier wave or other transport mechanism and includes any information delivery media. The term "computer readable media" may include communication media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 100 may include input device(s) 114 such as keyboard, mouse, pen, voice input device, touch input device, infra-red cameras, video input devices, and/or any other input device. Output device(s) 116 such as one or more displays, speakers, printers, and/or any other output device may also be included in device 100. Input device(s) 114 and output device(s) 116 may be connected to device 100 via a wired connection, wireless connection, or any combination thereof. In one embodiment, an input device or an output device from another computing device may be used as input device(s) 114 or output device(s) 116 for computing device 100.

Components of computing device 100 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 100 may be interconnected by a network. For example, memory 104 may be comprised of multiple physical memory units located in different physical locations interconnected by a network.

Those skilled in the art will realize that storage devices utilized to store computer readable instructions may be distributed across a network. For example, a computing device 130 accessible via network 120 may store computer readable instructions to implement one or more embodiments of the invention. Computing device 100 may access computing device 130 and download a part or all of the computer readable instructions for execution. Alternatively, computing device 100 may download pieces of the computer readable instructions, as needed, or some instructions may be executed at computing device 100 and some at computing device 130. Those skilled in the art will also realize that all or a portion of the computer readable instructions may be carried out by a dedicated circuit, such as a Digital Signal Processor (DSP), programmable logic array, and the like.

Figure 2:
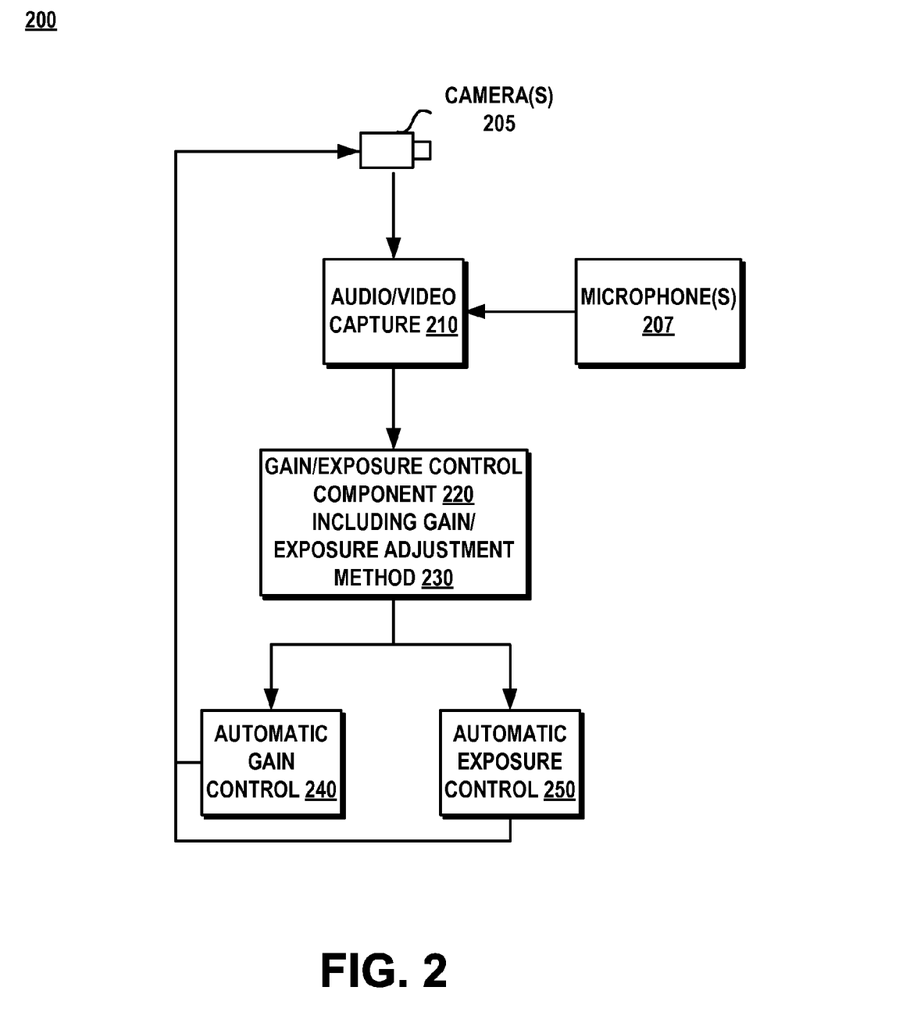
FIG. 2 shows an example system for controlling an automatic gain control and an automatic exposure control using an example implementation of a gain/exposure control component.

FIG. 2 shows an example system 200 for controlling an automatic gain control 240 and an automatic exposure control 250 using an example implementation of a gain/exposure control component 220. In the exemplary system 200, the gain/exposure control component further implements an example gain/exposure adjustment method 230. Finally, the example system 200 includes one or more cameras 205, one or more microphones 207, and an audio/video capture component 210.

The audio/video capture component 210 is communicatively coupled to the gain/exposure control component 220. The gain/exposure control component 220 is in turn communicatively coupled to each of the automatic gain control 240 and the automatic exposure control 250. Each of the automatic gain control 240 and the automatic exposure control 250 are further communicatively coupled to the one or more cameras 205. The one or more cameras 205 and the one or more microphones 207 are communicatively coupled to the audio/video capture component 210.

Referring now to the functioning of the example system 200, the audio/video capture component 210 includes functionality to digital capture video, audio, and still images to produce digital video, audio, and still image files from the one or more cameras 205. It is to be appreciated that the one or more cameras 205 may produce panoramic images when disposed as more than one panoramic camera, or, may also produce a panoramic image when disposed as a single sensor camera. The one or more cameras 205 may each include a camera lens, at least one image sensor, a control for controlling gain, a control for controlling exposure, and the like. The one or more microphones 207 may be disposed in an array such that the one or microphones may be used for sound source localization (SSL).

The one or more cameras 205 send digital image information to the audio/video capture component 210. Accordingly, the one or more microphones 207 also send analog audio information to the audio/video capture component 210. The audio/video capture component 210 may include an analog to digital convertor for converting sound waves received by the one or more microphones 207 into a digital audio signal, digital storage for storing the digitized audio and video, and the like. In particular, a digital video signal may be comprised of a series of sequential static digital video images that produce the illusion of motion when played back in order.

The automatic gain control (AGC) 240 is an adaptive system that amplifies the signal representing a captured digital image. The effect of amplifying the signal representing a captured digital image increases the values of all pixels in the captured digital image, thereby adding information to all pixels included in the captured digital image. In turn, the effect of adding information to all pixels in the captured digital image may be such that noise, or unwanted information, is added to the captured digital image. The automatic gain control 240 may further incrementally increase the gain or incrementally decrease the gain to bring the gain within a range of a predetermined target value offset above and below by a threshold value.

The automatic exposure control 250 controls the amount of light that falls upon the image sensor implemented by the audio/video capture device 210. The effect of increasing the amount of light that falls upon the sensor increases the strength of a signal representing a digital image. The effect of decreasing the amount of light that falls upon the sensor decreases the strength of a signal representing a digital image. The automatic exposure control 250 functions similarly to the automatic gain control 240 in that the automatic exposure control 250 may incrementally increase or incrementally decrease the exposure to bring the exposure within a range of a predetermined target value offset above and below by a threshold value.

Once the digital video and audio has been captured by the audio/video capture component 210, the gain/exposure control component 220 analyzes all or a portion of the captured audio and video to determine whether to increase or decrease the gain and/or exposure. The gain/exposure control component 220 implements the gain/exposure adjustment method 230 to perform such an analysis. Accordingly, the gain/exposure adjustment method 230 further implements several methods of detecting a region of interest within the captured image.

Once a region of interest has been detected, the gain/exposure adjustment method 230 calculates the image mean using the region of interest before adjusting the gain and exposure in accordance with the image mean. If no region of interest is detected, pixels in different regions of the captured digital image may have a weight applied depending on expected physical characteristics of the environment in which the image was captured. In the case where the one or more cameras 205 includes multiple cameras, the sensor included with each camera is adjusted using the portion of a panoramic image captured by the corresponding camera sensor. In the case where the one or more cameras 205 includes only a single camera, the sensor of the single camera is adjusted using the entire panoramic image captured by the single camera.

Figure 3:
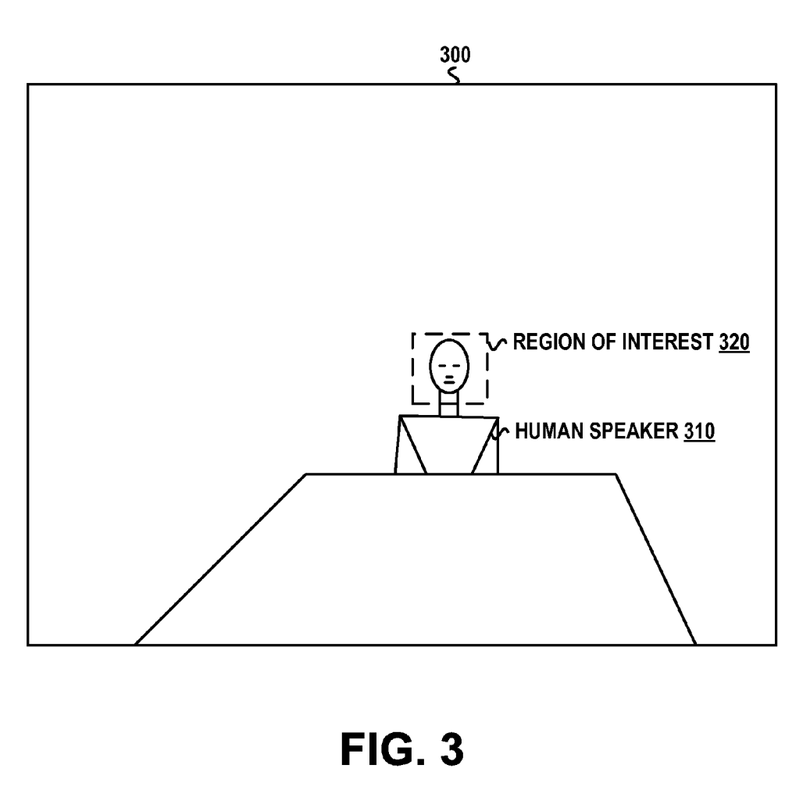
FIG. 3 shows an exemplary digital image including an example detected region of interest.

For example, FIG. 3 shows an exemplary digital image 300 including an example detected region of interest 320. For example, the exemplary digital image 300 may be a single captured digital image in a sequence of digital images that collectively comprise a digital video. In this example, the digital image 300 includes a human speaker 310. The region of interest 320 is a region or regions in the digital image 300 that contains all or a portion of the human speaker 310, or any other object of interest.

The region of interest 320 is shown as including the head of the human speaker 310; however, the region of interest 320 may include a smaller region of the human speaker 310, such as the mouth of the human speaker 310, or a larger region of the human speaker 310, such as the entire body of the human speaker 310. The region of interest 320 is illustrated as a polygon in this example; however, the shape of the region of interest 320 may be any type of shape including an outline of the human speaker 310, or the like. Furthermore, the region of interest 320 may be an array of pixels within the digital image 300 bounded by the edges of the region of interest 320.

Figure 4:
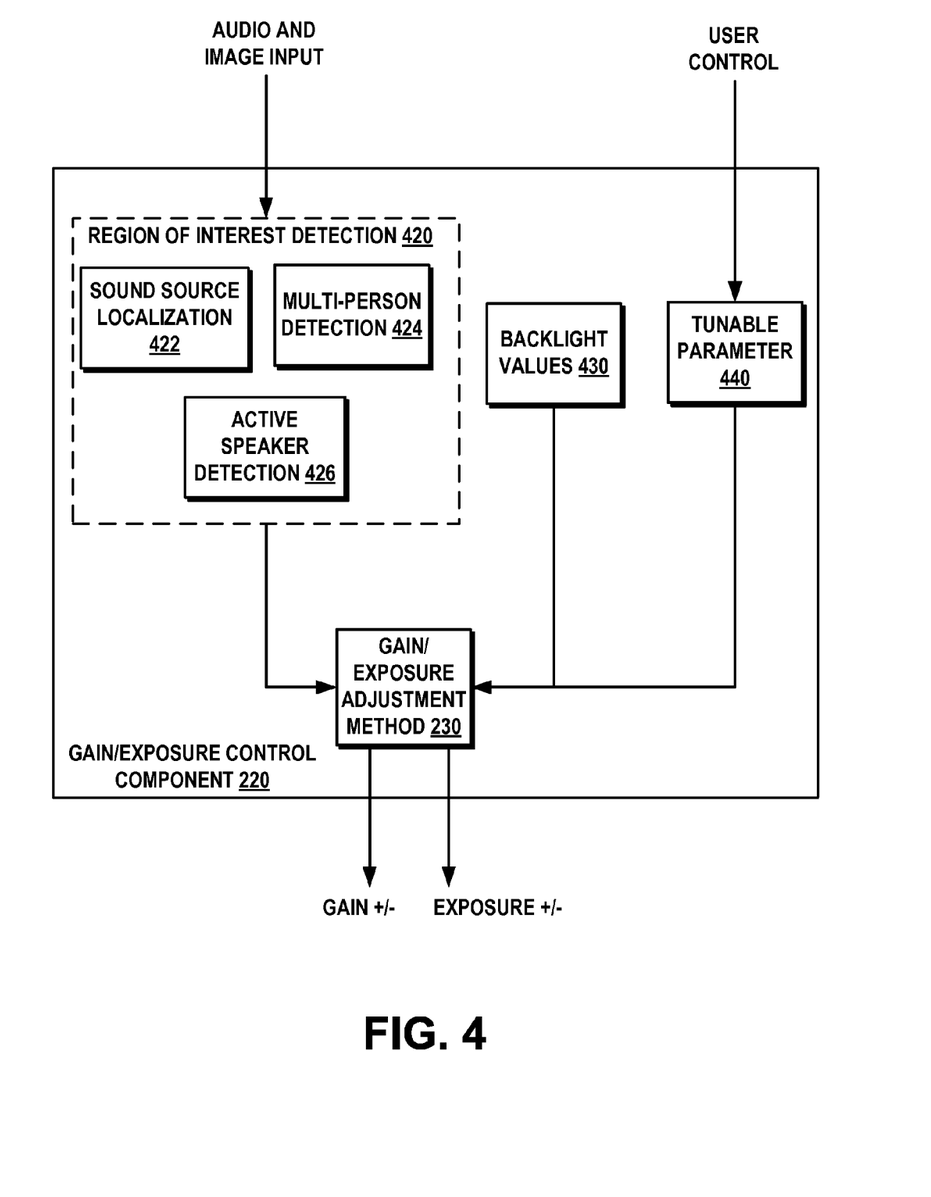
FIG. 4 shows further detail of an example gain/exposure control component.

Turning now to FIG. 4, FIG. 4 shows further detail of an example gain/exposure control component 220. The example gain/exposure control component 220 includes the gain/exposure adjustment method 230 (from FIG. 2), a region of interest detection component 420, a collection of one or more backlight weighted regions 430 for use by the gain/exposure adjustment method 430, and a tunable parameter 440 also for use by the gain/exposure adjustment method 230.

The region of interest detection component 420 includes sound source localization 422, multi-person detection 424, and active speaker detection 426. Active speaker detection 426 and sound source localization 422 are described in U.S. patent application Ser. No. 11/425,967 filed Jun. 22, 2006, titled "Identification of People Using Multiple Types of Input". Multi-person detection 424 is described in U.S. Pat. No. 7,050,607 filed Dec. 8, 2001, titled "A System and Method for Multi-View Face Detection".

Sound source localization 422 provides functionality for locating a speaker in a captured panoramic digital image by estimating the sound source time of arrivals from a microphone array and using the geometry of the array to estimate the location of the sound source. Active speaker detection 426 includes identifying a pool of identifying features from audio and video input and a classifier that selects a subset of identifying features to identify regions where people or a speaker may be located in a captured digital image. The region of interest detector includes a sound source localization component for locating a human speaker in the digital image using an audio probability diffusion function. Multi-person detection 424 includes a system and methods for identifying one or more areas of a digital image in which one or more human faces are likely to be. Multi-person detection 424 may also utilize information related to motion in a digital video file to identify an area in which one or more human faces are likely to be.

The region of interest detection component 420 may make use of any or all of sound source localization 422, multi-person detection 424, and active speaker detection 426 to determine a region of interest 320 (from FIG. 3). It is to be appreciated that each of sound source localization 422, multi-person detection 424, and active speaker detection 426 may be used in any combination to best determine the region of interest 320. For example, sound source localization 422 may be used to determine the likely location of one or more human speakers in a captured digital image, and the determined likely locations may be combined with likely location of human speakers identified by multi-person detection 424, resulting in a more accurate detection of the human speakers.

The gain/exposure adjustment method 230 utilizes the region of interest 320 determined by the region of interest detection component 420 to compute the image mean of a digital image under analysis. In the case where the region of interest detection component 420 does not determine a region of interest 320, the gain/exposure adjustment method 230 may use the backlight weighted regions 430 instead. The backlight weighted regions 430 will be discussed in more detail in the discussion of FIG. 5.

In addition, the gain/exposure adjustment method 230 may make use of a tunable parameter 440 to allow finer control of the gain/exposure adjustment method 230. The tunable parameter 440 may further expose an interface allowing a user of the gain/exposure control component 220 to modify the value associated with the tunable parameter 440. The effect of changing the value of the tunable parameter 440 may serve to increase or decrease the likelihood of the gain/exposure adjustment method 230 to increase or decrease the gain or exposure.

Figure 5:
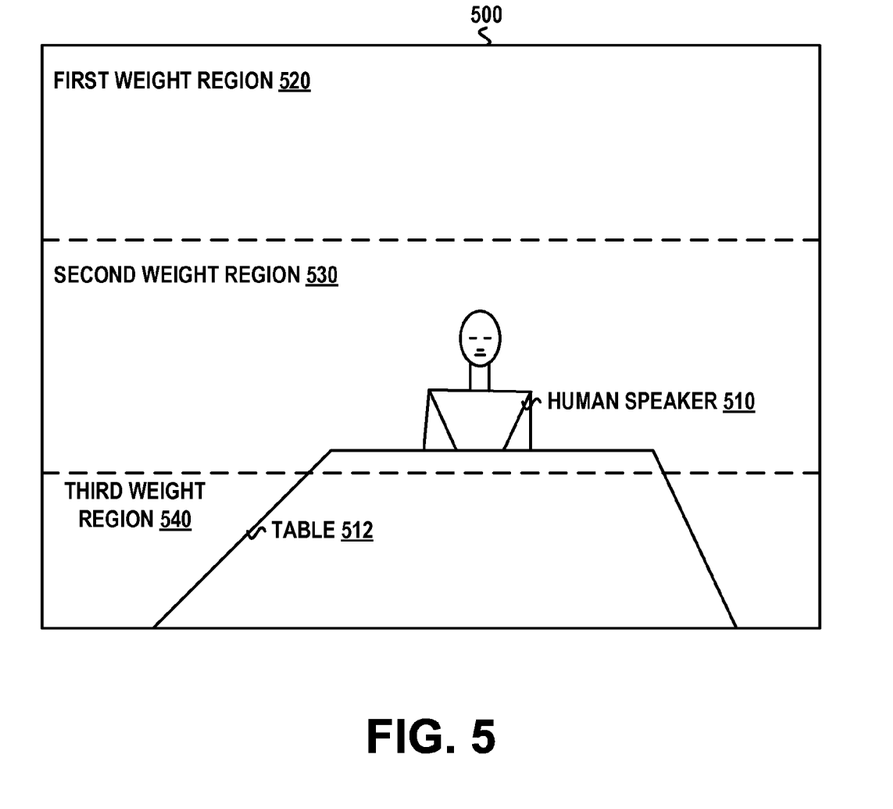
FIG. 5 shows an exemplary digital image including exemplary backlight regions.

Turning now to FIG. 5, FIG. 5 shows an exemplary digital image 500 including an example human speaker 510. The exemplary digital image 500 includes a first weight region 520, a second weighted region 530, and a third weighted region 540. While three weighted regions are illustrated in the digital image 500, it is to be appreciated that any number of different weighted regions may be included in the digital image 500. In an alternative embodiment, such a digital image 500 may instead be a panoramic image taken by a panoramic digital camera.

As previously discussed with respect to FIG. 3 and the detected region of interest 320, the weighted region most likely to include the human speaker 510 is given the highest weight. Accordingly, the next most likely region to include a human speaker is given a lower weight, and the next most likely region to include a human speaker is given an accordingly lower weight, and so on.

For example, the second weight region 530 may be most likely to include the human speaker 510 in the case where the digital image 500 is taken in a conference room setting including a table 512. In this example, the pixels included in the second weight region 530 may each have a weight of 1.38. The first weight region 520 may further be the next most likely region to include a human speaker as a person may be standing to speak. In this example, the pixels included in the first weight region 520 may each have a weight of 0.92. The third weight region 540 may be the least likely region to include a human speaker as the third weight region 540 is most likely to include the table 512 in a conference room setting. In this example, the pixels included in the third weight region 540 may each have a weight of 0.46.

As previously discussed, it is to be appreciated that the digital image 500 may include any number of weighted regions, and the pixels included in such weighted regions may be given any appropriate weight. Furthermore, such a digital image 500 including the first weight region 520, second weight region 530, and third weight region 540 may be used to determine an image mean in an example method for adjusting image gain and image exposure.

Figure 6:
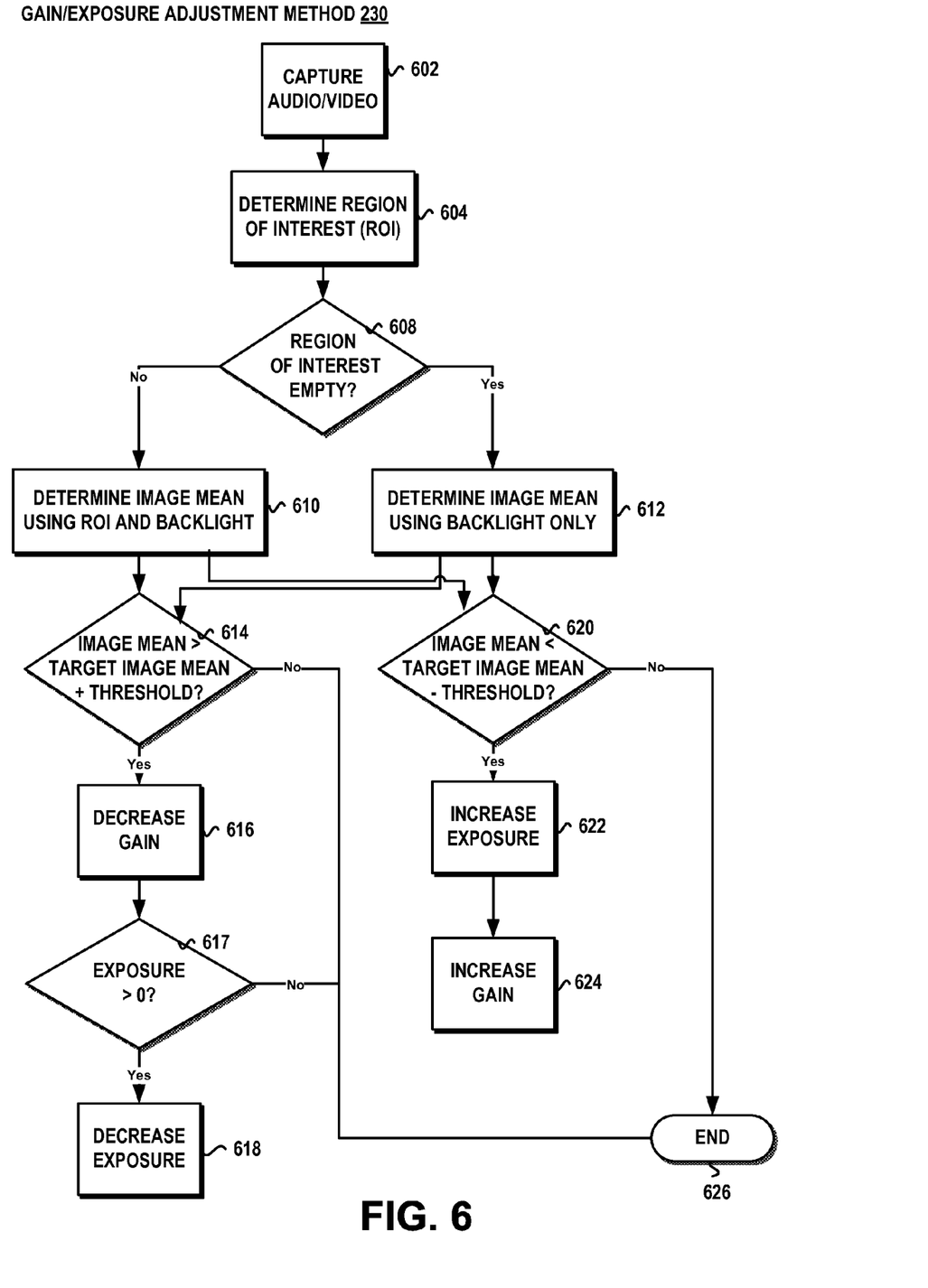
FIG. 6 shows an example method for adjusting image gain and image exposure.

Turning now to FIG. 6, FIG. 6 shows an example method 230 (from FIG. 2) for adjusting image gain and image exposure. Block 602 refers to an operation in which a frame of digital video and corresponding audio is captured and stored in memory.

Block 604 refers to an operation to determine one or more regions of interest within the frame of digital video captured at block 602. A region of interest may be determined in accordance with any or all of sound source localization 422 (from FIG. 4), multi-person detection 424 (from FIG. 4), or active speaker detection 426 (from FIG. 4) as described earlier. Each of sound source localization 422, multi-person detection 424, and active speaker detection 426 may be used individually or in combination to determine an area of pixels within the digital image captured at block 602 where a human speaker or human speakers are likely to be located.

Block 608 refers to an operation to determine if the region of interest determined at block 608 is empty. If each of sound source localization 422, multi-person detection 424, and active speaker detection 426 are unable to determine a region of interest likely to include a human speaker or human speakers, the region of interest will be empty. In response to a negative determination, flow continues on to block 610. In response to a positive determination, flow continues on to block 612.

Block 610 refers to an operation in which an image mean is determined using the region of interest determined at block 604 and backlighting image weights in accordance with the discussion of FIG. 5. In an example implementation, the image mean may be determined by implementing the following function in computer executable form:

$$image\_mean = A * mean(image * backlight) + (1-A) * mean(ROI)$$

Where image_mean represents the weighted mean of the digital image captured at block 602, image represents the pixels and any information associated with the pixels such as color information included in the digital image captured at block 602, backlight includes pixels and any weights associated with the pixels in accordance with the backlight regions discussed in FIG. 5, ROI represents the pixels and any information associated with the pixels such as color information included in the region of interest determined at block 604, and A represents a tunable parameter 440 (from FIG. 4). It is to be appreciated that the region of interest may one or more areas assigned different weights depending on the classification of the area. For example, the region of interest may include an area identified using active speaker detection or sound source localization as a human speaking. Such an area may be weighted more heavily than an area determined to include a human that is not speaking using multi-person detection. The weighted mean function is a typical mean function intended to determine an average value of the pixels and any information associated with the pixels in the array of pixels in the image passed to the mean function.

Flow continues on to both block 614 and block 620.

Block 612 refers to an operation in which the image mean is determined using only the backlighting image weights in accordance with the discussion of FIG. 5. In an example implementation, the image mean may be determined by implementing the following function in computer executable form:

$$image\_mean = mean(image * backlight)$$

Where image_mean represents the mean of the digital image captured at block 602, image represents the pixels and any information associated with the pixels such as color information included in the digital image captured at block 602, and backlight includes pixels and any weights associated with the pixels in accordance with the backlight regions discussed in FIG. 5. Such an image mean may also be referred to as an exposure/gain metric. The mean function is a typical mean function intended to determine an average value of the pixels and any information associated with the pixels in the array of pixels in the image passed to the mean function.

Flow continues on to both block 614 and block 620.

Block 614 refers to a determination as to whether the image mean determined at either block 610 or block 612 is greater than a predetermined image mean added to a predetermined threshold. For example, the predetermined image mean may be a value selected in accordance with one or more characteristics of the device used to capture the digital video image at block 602. The predetermined threshold value may also be selected in accordance with one or more characteristics of the device used to capture the digital video image at block 602.

A positive determination at block 614 may indicate that the gain and/or exposure of the device that captured the digital image at block 602 are each too high. In response to a positive determination, flow continues on to block 616. In response to a negative determination, flow ends at block 626.

Block 616 refers to a determination as to whether the image mean determined at either block 610 or block 612 is less than a predetermined image mean subtracted from a predetermined threshold. For example, the predetermined image mean may be a value selected in accordance with one or more characteristics of the device used to capture the digital video image at block 602. The predetermined threshold value may also be selected in accordance with one or more characteristics of the device used to capture the digital video image at block 602.

A positive determination at block 614 may indicate that the gain and/or exposure of the device that captured the digital image at block 602 are each too low. In response to a positive determination, flow continues on to block 616. In response to a negative determination, flow ends at block 626.

Block 616 refers to an operation in which the gain associated with the device that captured the digital image at block 602 is decreased. It is to be appreciated that if the gain is already at a minimum setting, the gain may not be decreased below a minimum setting. Flow continues on to block 617.

Block 617 refers to an operation in which it is determined if the exposure setting is at a setting greater than zero. In response to a negative determination, flow continues on to block 626. In response to a positive determination, flow continues on to block 618.

Block 618 refers to an operation in which the exposure associated with the device that captured the digital image at block 602 is decreased. It is to be appreciated that flow may return to block 602 such that the gain and exposure are decreased until the result is that the gain and exposure are set at such a level that block 614 results in a negative determination and flow ends.

Block 622 refers to an operation in which the exposure associated with the device that captured the digital image at block 602 is decreased. Flow continues on to block 624.

Block 624 refers to an operation in which the gain associated with the device that captured the digital image at block 602 is decreased. It is to be appreciated that flow may return to block 602 such that the gain and exposure are decreased until the result is that the gain and exposure are set at such a level such that block 620 results in a negative determination and flow ends.

The invention claimed is:

1. A method, comprising:
   determining a region of interest in a digital image having backlight weighted regions using any selected from the list of sound source localization, multi-person detection, active speaker detection, wherein each of the backlight weighted regions are weighted differently depending on a likelihood of the backlight weighted region including a human speaker; and
   determining an image mean using at least one backlight weighted region in response to determining the region of interest is empty;
   decreasing gain and/or decreasing exposure in response to determining the image mean is greater than a first predetermined target; and
   increasing gain and/or increasing exposure in response to determining the image mean is less than a second predetermined target subtracted from a second predetermined threshold.

2. The method of claim 1, wherein the determining a weighted image mean is performed using one or more vertically stacked backlight weighted regions, wherein each of the one or more backlight weighted regions is a horizontally oriented rectangle, wherein the pixels associated with backlight weighted regions located at the center are weighted with highest values, the pixels associated with backlight weighted regions located at the top are weighted with second highest values, and pixels associated with backlight weighted regions located at the bottom regions are weighted with third highest values.

3. The method of claim 1, wherein the first predetermined target includes an added first predetermined threshold.

4. The method of claim 1, further comprising using a tunable parameter in adjusting gain and/or exposure.

5. The method of claim 1, wherein the backlight weighted regions are weighted differently depending on a likelihood of the backlight weighted region including a human speaker.

6. The method of claim 1, wherein the region of interest is one or more pixels in the digital image including the image of a human face.

7. The method of claim 1, wherein the image mean is determined by calculating A*mean(image*backlight)+(1−A)*mean(ROI).

8. The method of claim 1, wherein the image mean is determined using a tunable parameter with a value of 0.7.

9. A computer-readable memory storing instructions for performing steps when executed by a processor, comprising:
   determining a region of interest in a digital image having backlight weighted regions using any selected from the list of sound source localization, multi-person detection, active speaker detection, wherein each of the backlight weighted regions are weighted differently depending on a likelihood of the backlight weighted region including a human speaker; and
   determining an image mean using at least one backlight weighted region in response to determining the region of interest is empty;
   decreasing gain and decreasing exposure in response to determining the image mean is greater than a first predetermined target; and
   increasing gain and increasing exposure in response to determining the image mean is less than a second predetermined target subtracted from a second predetermined threshold.

10. The computer-readable memory of claim 9, wherein the determining a weighted image mean is performed using one or more vertically stacked backlight weighted regions, wherein each of the one or more backlight weighted regions is a horizontally oriented rectangle, wherein the pixels associated with backlight weighted regions located at the center are weighted with highest values, the pixels associated with backlight weighted regions located at the top are weighted with second highest values, and pixels associated with backlight weighted regions located at the bottom regions are weighted with third highest values.

11. The computer-readable memory of claim 9, wherein the first predetermined target includes an added first predetermined threshold.

12. The computer-readable memory of claim 9, wherein the second predetermined target includes a subtracted second predetermined threshold.

13. The method of claim 1, wherein the image mean is determined by calculating mean(image*backlight).

14. The computer-readable memory of claim 9, wherein the at least one backlight weighted region is a second backlight weighted region, and further comprising a first backlight weighted region and a third backlight weighted region, the first backlight region located above the second backlight region and the second backlight weighted region located above the third backlight weighted region, wherein the second backlight weighted region includes a human face and the pixels associated with the second backlight weighted region include a weight value higher than the pixels associated with the first backlight weighted region and the pixels associated with the second backlight weighted region include a weight value higher than the pixels associated with the third backlight weighted region, and wherein the pixels associated with the first backlight weighted region include a weight value higher than the pixels associated with the third backlight weighted region.

15. An image gain and exposure control component, comprising:
   a region of interest detector for determining a region of interest in a digital image having backlight weighted regions using any selected from the list of sound source localization, multi-person detection, active speaker detection, wherein each of the backlight weighted regions are weighted differently depending on a likelihood of the backlight weighted region including a human speaker; and
   a gain and exposure adjustor, for determining an image mean using at least one backlight weighted region in response to determining the region of interest is empty;

decreasing gain and/or decreasing exposure in response to determining the image mean is greater than a first predetermined target; and increasing gain and/or increasing exposure in response to determining the image mean is less than a second predetermined target subtracted from a second predetermined threshold parameter.

16. The image gain and exposure control component of claim 15, wherein the region of interest detector includes a sound source localization component for locating the human speaker in the digital image using an audio probability diffusion function.

17. The image gain and exposure control component of claim 15, wherein the region of interest detector includes a multi-person detector for locating one or more human speakers in the digital image.

18. The image gain and exposure control component of claim 15, wherein the region of interest detector includes an active speaker detector that uses audio, motion, and image features to detect a human speaker in the digital image.

19. The image gain and exposure control component of claim 15, further comprising an interface for a user to control the tunable parameter.

20. The image gain and exposure control component of claim 15, wherein the backlight weighted region includes at least one predetermined region of weighted pixels where one or more human speakers are located.

* * * * *